Sept. 19, 1944.  M. W. KELLY  2,358,399
DUAL BICYCLE SEAT
Filed Nov. 4, 1942  2 Sheets-Sheet 1
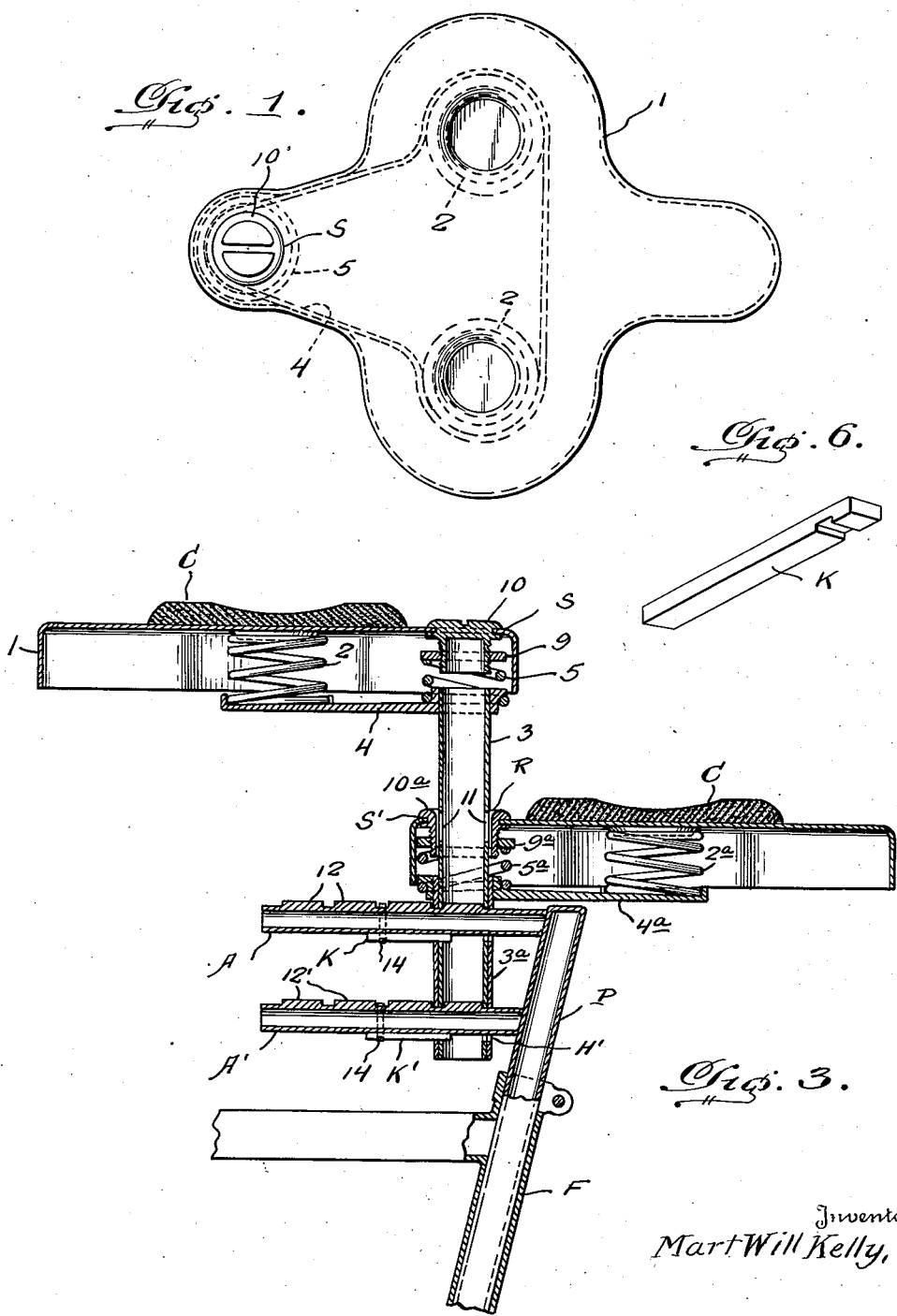
Inventor
Mart Will Kelly,
By J. Stanley Burch
Attorney Sept. 19, 1944.    M. W. KELLY    2,358,399
DUAL BICYCLE SEAT
Filed Nov. 4, 1942    2 Sheets-Sheet 2
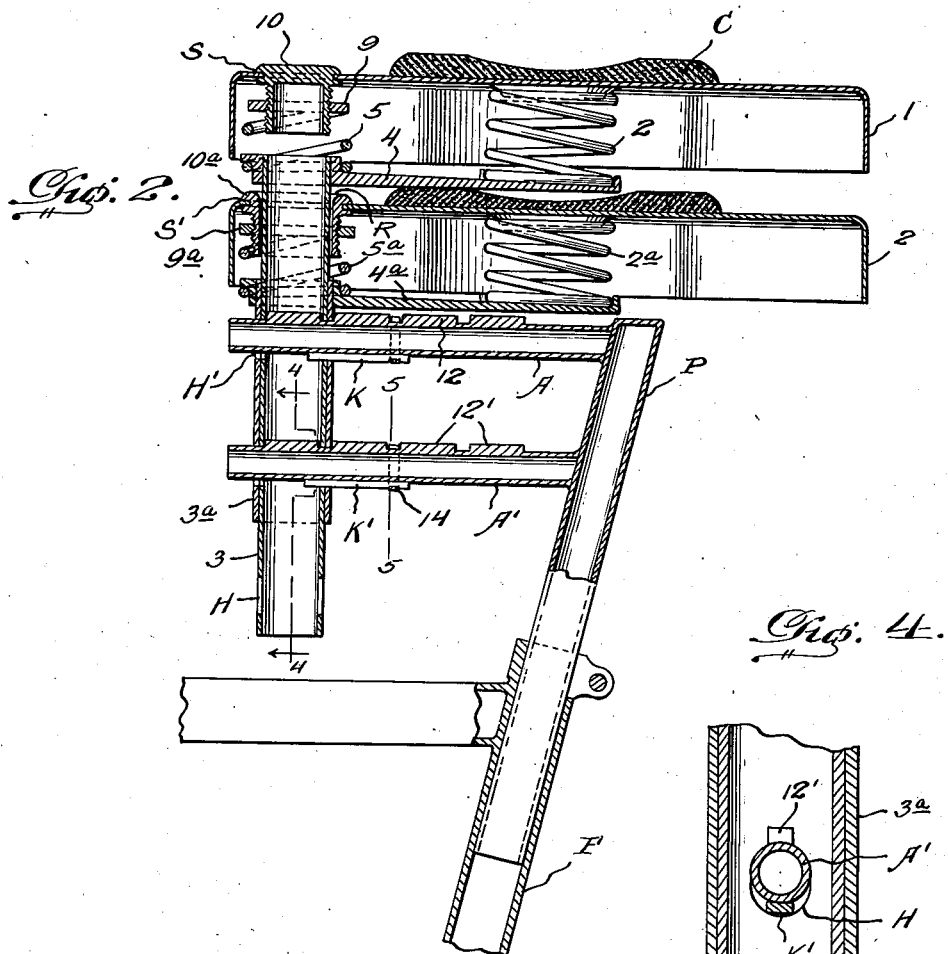
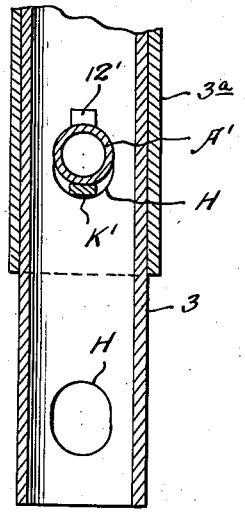
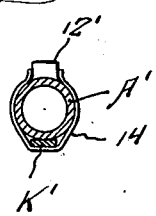
Inventor
Mart Will Kelly,
By J. Stanley Burch
Attorney Patented Sept. 19, 1944

2,358,399

UNITED STATES PATENT OFFICE 2,358,399

DUAL BICYCLE SEAT

Mart Will Kelly, Bartlesville, Okla.

Application November 4, 1942, Serial No. 464,494

5 Claims. (Cl. 155—5.12)

This invention relates to a bicycle seat which is so constructed that it can be readily adjusted to accommodate either one or two persons.

Heretofore, the conventional single seat type of bicycle has been adapted to carry only one person, although it is structurally capable of carrying a load equal to the weight of two average persons without failure of parts. In fact, the second passenger has always been carried on the frame, handle bars, or rear luggage carrier. In the past, a special tandem bicycle, built for two, has been used in limited numbers, which tandem bicycle embodies a long frame, double handle bars, double seats, and double pedal hangers. My invention should not be confused with this tandem type of bicycle, as it is an improvement to be applied to the conventional single seat type of bicycle.

There are a minimum of three adjustments that must be made with a bicycle seat in order to meet all of the requirements of any size or type of rider with respect to comfort and minimum fatigue. These are: (1) Adjustment of the vertical distance between the seat and the pedal hanger so that the leg is fully extended when the pedal is in the down position. This is essential to minimize fatigue and secure the maximum effective force upon the pedal for a given tension of the leg biceps. (2) Adjustment of the horizontal distance that the seat is situated behind the pedal hanger. This is governed by the physical dimensions and muscular development of the individual. The further back the seat, the more stress placed upon the arms and back of the rider, and the greater the load placed upon the seat. This adjustment has some influence upon the required tilt of the seat. (3) The tilt of the seat must be adjusted so that the rider will not tend to slide off of it after the correct adjustments (1) and (2) have been made.

My invention makes it possible to effect all three of the aforementioned adjustments quickly and without the use of a wrench, or special tools.

An object of my invention is to enable a conventional single seat type of bicycle to accommodate either one or two passengers by equipping it with a novel design of dual seat.

Another object is to present a design for a dual bicycle seat which will serve as a single seat on the conventional bicycle, and which will afford a wide range of quick adjustments, that can be made without the use of a wrench, to meet the individual needs of various sized riders.

Another object is to provide a dual seat that can be quickly and easily adjusted, without the use of wrenches, to comfortably seat two persons on the conventional single seat type of bicycle. In order for two persons to ride the conventional single seat type of bicycle with this dual seat, it is preferable that duplex pedals be used in conjunction with it.

Another object is to provide a dual seat, each saddle of which can be individually adjusted to meet the needs of one person, independently of the adjustment of the other saddle.

Another object is to provide a dual seat, which gives enough latitude and flexibility of adjustment both vertically and horizontally to make it possible for two persons to simultaneously and comfortably ride a conventional single seat type of bicycle.

Still another object is to furnish a seat spring suspension that will permit the saddle to tilt back and forth with each stroke of the rider's legs, thereby affording a seat that automatically adjusts itself to the changing positions of the rider as he pedals the bicycle.

Another object is to furnish a seat spring suspension which will contribute to the softness of the ride due to the cantilever action or manner in which the springs carry the load, and due to the saddle being floated on two springs in compression and one that may be either in tension or compression according to the rider's position.

A still further object is to furnish a seat post with two horizontal arms or extensions provided with lugs in such a manner that the seat can be readily adjusted in several positions without the use of wrenches.

With the above and other objects in view, the present invention consists in the novel form, combination and arrangement of parts hereinafter more fully described, shown in the accompanying drawings and claimed.

In the drawings:

Figure 1 is a top plan view of a dual bicycle seat constructed in accordance with the present invention.

Figure 2 is a fragmentary view, partly in side elevation and partly in vertical longitudinal section, showing the seat of Figure 1 applied to the frame of a conventional single seat type of bicycle, and with the saddles adjusted one directly beneath the other.

Figure 3 is a view similar to Figure 2 with the saddles differently adjusted and arranged so that one projects forwardly and the other projects rearwardly.

Figure 4 is an enlarged fragmentary vertical section taken on line 4—4 of Figure 2.

Figure 5 is an enlarged transverse section taken on line 5—5 of Figure 2; and

Figure 6 is an enlarged perspective view of one of the keys used to maintain the saddles in horizontally adjusted position.

Referring in detail to the drawings, Figure 2 shows the dual seat with one saddle 1 situated directly above the other saddle 2, the arrangement for a single rider. Each saddle is independently supported by three springs, the springs 2 and 2a riding in compression, and the spring 5 or 5a riding in either tension or compression, depending upon which direction the load is tending to tilt the saddle. A seat base 4 or 4a supports the springs for each saddle, and it is in turn rigidly fixed to an auxiliary seat post 3 or 3a. The auxiliary seat posts 3 and 3a are dimensioned so that the former slips inside of the latter in a sleeve fit which permits sliding it up or down by hand, but which gives a minimum amount of play or slack between them. Both of these auxiliary posts 3 and 3a have oblong holes H and H' in them and so spaced that they permit slipping of the auxiliary seat posts over lugs 12 and 12' provided on the upper portion of horizontal arms A and A' rigid with and projecting forwardly from the main seat post P which is vertically adjustable in the usual main bicycle frame member F. Lugs 12 and 12' are so shaped and of such lengths that they fit the inside diameter of auxiliary seat post 3 and have spaces between them sufficient to receive the edges of both posts 3 and 3a at the tops of their aligned openings or holes H and H'. These auxiliary seat posts are locked in adjusted position on the arms A and A' by means of keys K and K' which snugly fit between the arms a and a' and the lower edges of the openings H and H' in the posts 3 and 3a. A spring clamp 14 is arranged to embrace each arm A between adjacent lugs 12 and the associated key K or K' to retain the latter in locked position. When adjusting the seat for two riders, keys K and K' are removed and both saddles, together with their posts 3 and 3a are lifted to permit them to be slipped off of the arms A and A'. In most cases, it will be more satisfactory and comfortable for the rider with the longest legs to ride in front, in which case the top saddle with auxiliary seat post 3, will be revolved 180° from the position of Figure 2 and raised as shown in Figure 3 so that the two horizontal seat post arms slip into the two lower oblong holes of the seat post 3. The two saddles are thus reinstalled with the top saddle extending in front of and above the lower one. Since the saddle of the first rider must not, for comfort, be in front of the vertical line bisecting the center line of the pedal hanger of the bicycle, it will be necessary to slip the auxiliary posts 3 and 3a farther back on the horizontal arms of the post P as is also shown in Figure 3. Thus, the front saddle will be a few inches in front of the position it normally occupies for a single rider, but not far enough ahead to be in front of the saddle hanger of the bicycle. The rear seat is slipped a few inches back of its normal position for a single rider, and thus the horizontal distance that each rider is seated behind the pedal crank is divided up so that they can both pedal in comfort and with a minimum of fatigue. These horizontal adjustments, and adjustments vertically can be used to suit the needs and desires of riders with differing statures.

The tilt of saddle 1 is adjusted and controlled by the front spring assembly, which consists of spring 5 that is rigidly fixed at its base to seat frame 4 and which has a threaded head 9 affixed to its top, head 9 having threaded engagement with an adjusting screw 10 swiveled to saddle 1 at S. Similarly, spring 5a of saddle 2 is rigidly fixed at its base to seat frame 4a and has a threaded head 9a affixed to its top, head 9a having threaded engagement with an adjusting bushing 10a swiveled to saddle 2 as at S'. Adjusting screw 10 or bushing 10a is rotated to effect vertical adjustment of the associated head 9 or 9a so as to vary the tension of spring 5 or 5a and thereby adjust the tilt of the associated saddle 1 or 2. The top of bushing 10a is recessed as at R, where it fits around the post 3, to prevent pinching of the riders clothes.

Springs 2 and 2a can be made in given standard strengths, so that a strong spring may be purchased for a heavy rider and a weak spring for a light rider. More than one set of springs may be owned for one bicycle and quickly changed to meet the immediate rider's need by pulling up on the back end of the saddle 1 or 2 and slipping the springs 2 or 2a out and replacing them with springs of the desired strength. A saddle cover C may be provided for either or both saddles, the same being made of soft material such as sponge rubber with a waterproof covering.

Although a specific construction of this device has been illustrated and described, it will be appreciated that any modifications and changes may be made in its various parts, without departing from the invention, and all such changes that come within the scope of the appended claims are embraced thereby.

What I claim as new is:

1. A dual bicycle seat to be used on a conventional bicycle frame and adjusted to meet the needs of various sized persons, riding either singly or two riding simultaneously on one bicycle, said seat comprising two auxiliary seat posts one telescoped within the other, two saddles, one superposed above the other and each separately and independently supported by one of said auxiliary seat posts, two seat frames, one rigidly affixed to the top of each auxiliary seat post, and three springs supported by each seat frame and supporting the associated saddle.

2. A dual bicycle seat comprising a main seat post provided with two rigid horizontal arms which project forwardly one above the other, lugs on the upper portions of said arms, two auxiliary seat posts, one telescoped through the other, a seat supporting frame fixed to the upper end of each auxiliary seat post, a saddle disposed above each seat supporting frame, springs interposed between each supporting frame and its associated saddle, said auxiliary seat posts having transverse oblong openings for reception of said horizontal arms, said auxiliary seat posts being of a diameter to seat at the upper edges of their oblong openings between the lugs of said horizontal arms, and means to retain the auxiliary seat posts seated between said lugs.

3. A dual bicycle seat comprising a main seat post provided with two rigid horizontal arms which project forwardly one above the other, lugs on the upper portions of said arms, two auxiliary seat posts, one telescoped through the other, a seat supporting frame fixed to the upper end of each auxiliary seat post, a saddle disposed above each seat supporting frame, springs interposed between each supporting frame and its associated saddle, said auxiliary seat posts having transverse oblong openings for reception of said horizontal arms, said auxiliary seat posts being of a diameter to seat at the upper edges of their oblong openings between the lugs of said horizontal arms, and means to retain the auxiliary seat posts seated between said lugs, said last named means comprising removable keys insertible in the openings of the auxiliary seat posts at the bottoms of said horizontal arms.

4. A dual bicycle seat comprising a main seat post provided with two rigid horizontal arms which project forwardly one above the other, lugs on the upper portions of said arms, two auxiliary seat posts, one telescoped through the other, a seat supporting frame fixed to the upper end of each auxiliary seat post, a saddle disposed above each seat supporting frame, springs interposed between each supporting frame and its associated saddle, said auxiliary seat posts having transverse oblong openings for reception of said horizontal arms, said auxiliary seat posts being of a diameter to seat at the upper edges of their oblong openings between the lugs of said horizontal arms, and means to retain the auxiliary seat posts seated between said lugs, said last named means comprising removable keys insertible in the openings of the auxiliary seat posts at the bottoms of said horizontal arms, and spring clips arranged to embrace said horizontal arms between the lugs and to engage around the keys to hold the latter in place.

5. A dual bicycle seat comprising a main seat post having rigid forwardly projecting arms disposed one above the other, two auxiliary seat posts apertured to receive said arms and rotatable one within the other, a seat supporting frame carried by the upper end of each auxiliary seat post, a saddle disposed above each seat frame, springs interposed between each seat frame and saddle, said saddles and seat frames being carried at corresponding ends by said auxiliary seat posts, whereby rotation of one auxiliary seat post relative to the other may be had for extending a saddle forwardly and the other rearwardly relative to said auxiliary seat posts.

MART WILL KELLY.